March 6, 1962  J. A. BOMBARDIER  3,023,824
ENDLESS TRACK VEHICLE
Filed June 20, 1960  2 Sheets-Sheet 1
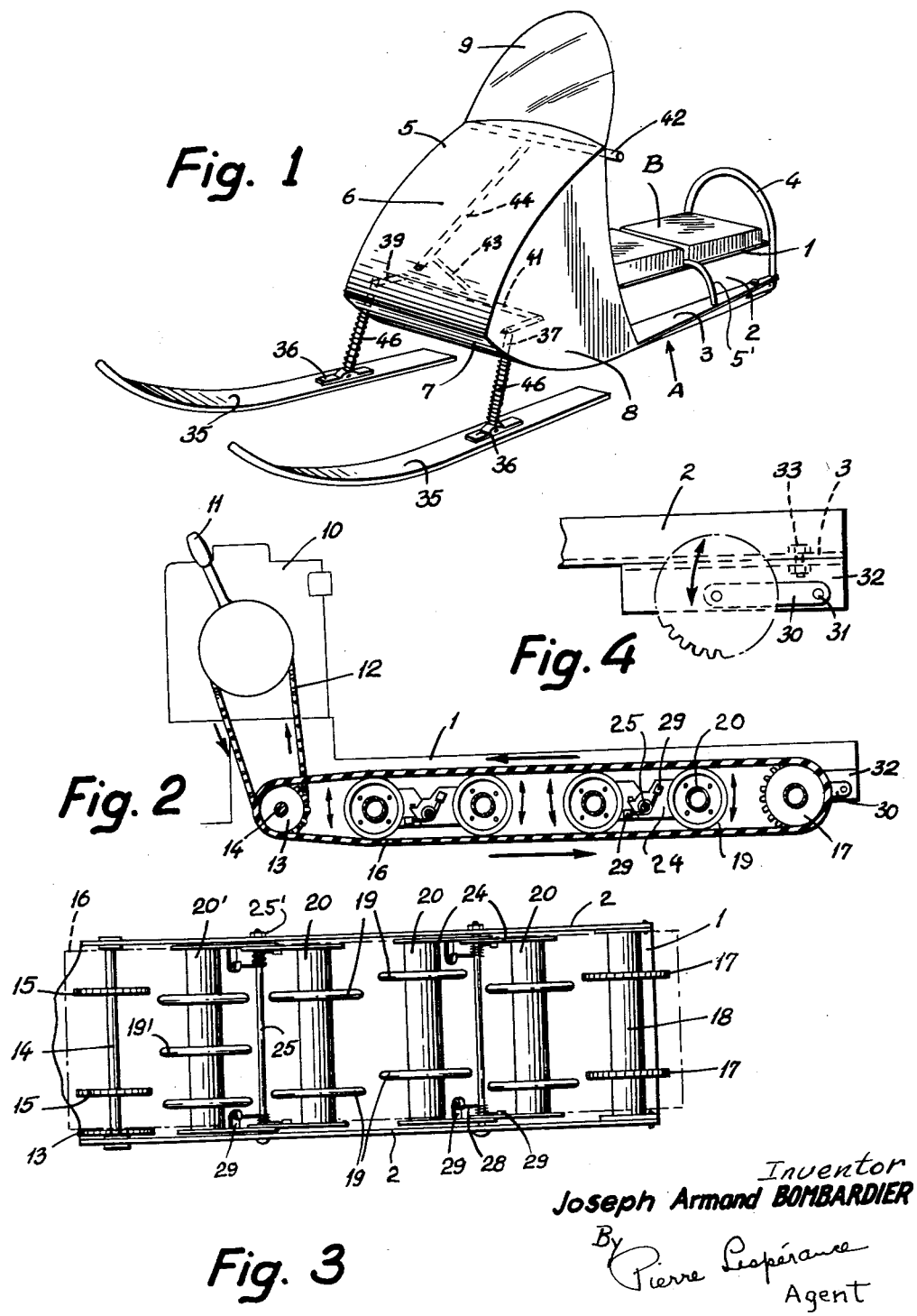
Inventor
Joseph Armand BOMBARDIER
By Pierre Lespérance
Agent March 6, 1962 J. A. BOMBARDIER 3,023,824
ENDLESS TRACK VEHICLE
Filed June 20, 1960 2 Sheets-Sheet 2
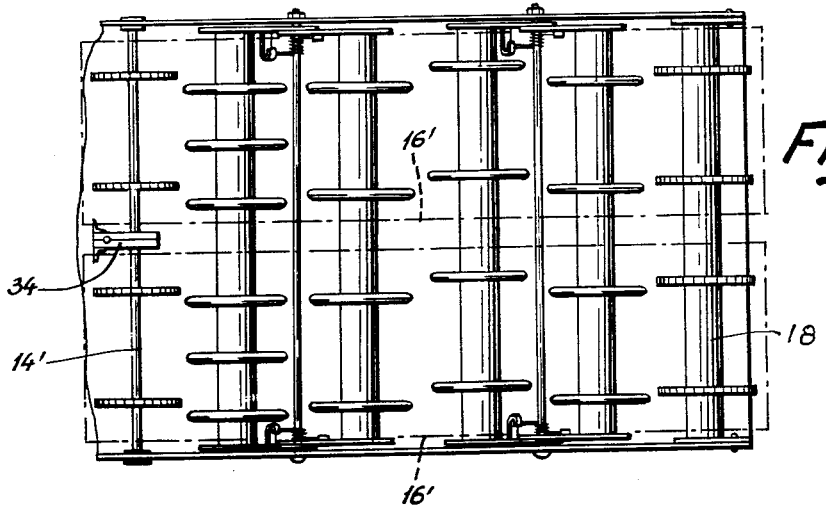
Fig. 5.
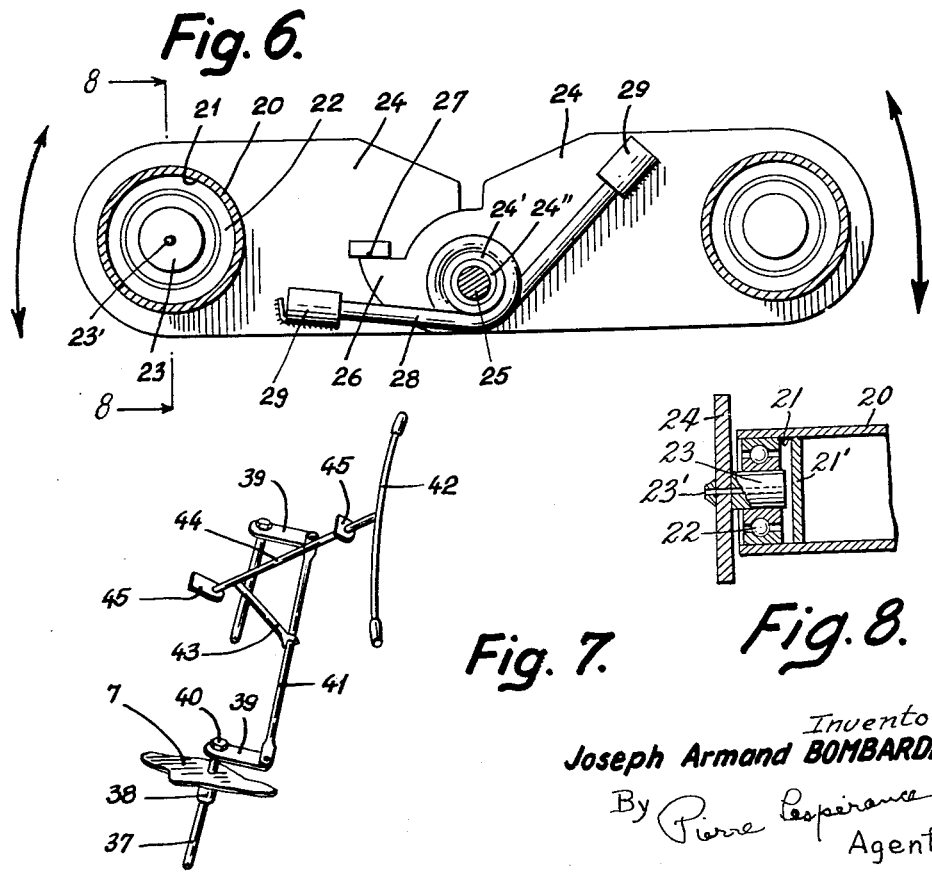
Fig. 6.
Fig. 7.  Fig. 8.
Inventor
Joseph Armand BOMBARDIER
By Pierre Lesperance
Agent United States Patent Office 3,023,824
Patented Mar. 6, 1962

3,023,824
ENDLESS TRACK VEHICLE
Joseph Armand Bombardier, Valcourt, Quebec, Canada
Filed June 20, 1960, Ser. No. 37,274
Claims priority, application Canada July 25, 1959
7 Claims. (Cl. 180—9.64)

The present invention relates to an endless track motor vehicle and more particularly to an endless track motor vehicle which has a small size, and is of light weight construction for use by one or two persons over rough ground, through fields, in the woods, and on snow.

The endless track vehicle in accordance with the invention is intended to be used by hunters, prospectors, army personnel and the like, because it enables fast movement over roadless areas, and because it can be easily lifted by one or two men over an obstruction or the like.

The general object of the present invention resides therefore in the provision of an endless track vehicle of the character above mentioned.

A more specific object of the present invention resides in the provision of an improved suspension system for the endless track which is of a simple construction and acts as shock absorbers, such that the passengers are subjected to very little jerks, despite the uneveness of the ground.

Yet another important object of the present invention resides in the provision of a vehicle of the character described in which the engine and transmission to the endless track is arranged in a compact and improved manner.

Yet another important object of the present invention resides in the provision of a vehicle of the character described having simple means for constantly maintaining the endless track in contact with the ground over the entire bearing surface of the track in spite of elevations, bumps, and depressions of holes, such that the track adheres well even on a slippery surface.

Yet another object of the present invention resides in a vehicle of the character described in which skis are provided which are easily removable in order to reduce the room required for transportation by aircraft or the like, or storing in a reduced space.

Still another important object of the present invention resides in the provision of a vehicle of the character described having simple means for steering the skis.

The foregoing and other important objects of the present invention will become more apparent during the following disclosure and by referring to the drawings, in which:

FIGURE 1 is a perspective view of the vehicle in accordance with the present invention;

FIGURE 2 is a longitudinally slightly schematic section of the assembly of the endless track and of the transmission and suspension means;

FIGURE 3 is a plan view of the bottom of the vehicle, the endless track being removed;

FIGURE 4 is a partial side elevation of the rear end of the vehicle on an enlarged scale illustrating the means for maintaining the rear part of the endless track in contact with the ground and for tensioning said endless track;

FIGURE 5 is a plan view of the bottom of a modified vehicle of a width double that of the vehicle of FIGURES 1 and 3 and illustrating the arrangement of the suspension used for employing two endless tracks or treads side by side;

FIGURE 6 is a side elevation of one of the suspension elements of the present invention;

FIGURE 7 is a schematic perspective view of the steering assembly; and

FIGURE 8 is a cross-section taken along line 8—8 of FIGURE 5.

In the drawings, the same reference characters indicate the same elements throughout.

The vehicle A in accordance with the present invention comprises a frame made of relatively heavy gauge sheet metal, and having an inverted U-shaped cross section so as to define a flat top 1 on which may be disposed cushions B and sides 2 which are themselves provided at their lower edge with horizontally and externally extending horizontal flanges 3 forming foot rests, the width of which decreases towards the rear of the vehicle.

A semi-circular handle 4 may be secured to the rear of the vehicle and serves to lift the latter whenever necessary. Handle 4 serves also as a guard for maintaining in position objects carried by the vehicle. Reinforcing rods 5' are welded or otherwise secured to the top of the U-shape frame and to the flanges 3.

The vehicle is further provided at the front thereof with a hood 5 for the protection of the passengers and having a generally triangular cross section and constituted by curved top wall 6 and bottom wall 7 and flat lateral walls 8. The bottom wall 7 is convex and is inclined upwardly towards the front of the vehicle and is secured to the frame. The back of lateral walls 8 is secured to the free edges of the flanges 3. A transparent windshield 9 is attached to the top edge of top wall 6. The hood 5 protects the passengers, more specifically the driver who can rest his feet on the flanges 3 and between the sides 2 of the U-shape frame and the lateral walls 8. The driver's legs will thus extend on both sides of the engine schematically indicated at 10 in FIGURE 2 and which is secured in vertical position on top wall 1 of the U-shaped frame and inside the hood. The engine is an internal combustion engine and gives off heat to keep the conductor warm in cold weather.

Engine 10 is provided with a gear box and clutch controlled by lever 11 and driving the endless track 16 by means of transmission chain 12 which passes through the U-frame top 1 and meshes with a sprocket gear 13 secured to transverse front shaft 14. Two toothed wheels 15 the teeth of which are made of rubber are secured to shaft 14 and serve as driving wheels for the endless track 16. The toothed wheels 15 are made of two metal discs disposed on each side of and clamping a rubber ring provided with teeth as described in U.S. Patent No. 2,721,485, dated October 25, 1955, by the same applicant. The endless track or tread 16 is of the type described in U.S. Patent 2,899,242, dated August 11, 1959, by Germain Bombardier and consists of a rubber endless band provided with two series of longitudinally disposed holes adapted to receive the teeth of the toothed wheels 15 as well as the teeth of back toothed wheels 17 mounted on the hollow tubular axle 18 at the back of the vehicle. The inside face of the endless track 16 is smooth and uniform and thus constitutes a running surface for the bearing wheels 19 mounted on the hollow tubular shafts 20.

As shown in FIGURE 3, the bearing wheels 19 are disposed in such a way as to alternate on each side of the lines joining the registering front and back toothed wheels 15 and 17 and thus bear on the track 16 on each side of the series of holes made in said track for receiving the teeth of wheels 15 and 17. The hollow tubular shaft 20' at the front of the vehicle is provided with an additional central bearing wheel 19' because the major share of the impacts is received by the front bearing wheels due to the fact that the gear wheels 13 have a smaller diameter than the bearing wheels 19, 19' and that the forward part of the endless track is inclined upwardly at this area in order to be protected by the bottom wall 7 of the hood 5.

Each hollow shaft 18 and 20 or 20' consists of a cylindrical tubular element made of sheet metal and closed by a partition 21' spaced from the end of the tubular element in order to define a cavity 21 for receiving a ball bearing assembly 22, the outer race of which is tightly fitted within cavity 21 and the inner race of which fits over a stud 23 which is rigidly secured, as far as shafts 20 and 20' are concerned, to the outer ends of lever plates 24. Each stud 23 has a greasing hole 23' for lubricating the bearing 22.

Plates 24 are pivotally connected in pairs at the overlapping inner end portions thereof. One plate has a sleeve 24' slidably fitting over the sleeve 24" of the other plate and the sleeve 24" fits over a rod 25 which extends transversely of the motor vehicle and through the side walls 2 of the U-shape frame, said rods 25 having a head at one end and being threaded to receive a nut 25' at the other end. Thus, each rod 25 serves as pivot for two pairs of plates 24 such that the said pairs of plates may rotate in a vertical plane about the rod 25. One of the lever plates 24 is provided with a finger 26 formed by the cut out edge of said lever plate and adapted to abut against an abutment block 27 welded or otherwise rigidly secured to the other plate 24. A strong coil spring 28 is spirally wound around the outer sleeve 24' and its straight free end portions are respectively secured to the two lever plates 24 by means of curved retainer members 29 welded to said plates. The coil spring 28 is stressed in such a way that the pair of lever plates 24 are urged to pivot downwardly around rod 25 until finger 26 abuts against abutment block 27. Thus, the assembly of the two lever plates 24 on each side of the vehicle together with two shafts 20 or shafts 20 and 20', and of the bearing wheels 19 and 19' are capable of free pivotal movement about the transverse rods 25 in order to closely follow the profile of the ground. The lever plates 24 further pivot upwardly with respect to each other against the action of springs 28 under the weight of the passengers and under impacts and shocks caused by bumps and holes. This arrangement forms a very smooth suspension and also enables to maintain the endless tread 16 in constant contact with the ground in spite of the unevenness of the surface. Thus, a good traction is obtained as well as passenger comfort. It will be noted that the transverse rods 25 and lever plates 24 are wholly confined within the space defined by the planes containing the lower ground engaging run and the upper return run of endless track 16 as shown in FIGURE 2. Also the return run of track 16 rests directly on the bearing wheels 19, 19'. This arrangement has a minimum height enabling to make the vehicle with a low center of gravity to prevent overturning.

The rear tubular shaft 18 is rotatably mounted at the front ends of arms 30 themselves pivotally connected at their rear end at 31 to an angle iron 32 which is secured, as shown in FIGURE 4, underneath the lateral flange 3 of the U-shaped frame at the back of the latter such as to enable longitudinal tightening of the endless belt by means of the bolt and nut 33. When the vehicle is running the upper portion of the endless tread 16 is tensioned towards the front of the vehicle and thus urges the rear shaft 18 into a lowered position with the arms 30 substantially parallel to the flanges 3, as shown in FIGURES 2 and 4, and, in this lowered position, the rear part of the endless tread which surrounds the toothed wheels 17 of the rear shaft 18 are maintained in contact with the ground.

The vehicle illustrated in FIGURES 1, 2 and 3 is relatively narrow and has only one endless tread 16. However, it is possible to build a wider vehicle having two endless treads 16' disposed side by side as illustrated in FIGURE 5. In this embodiment the arrangement of FIGURE 3 is duplicated, that is the tubular shafts have double the length and have double the number of bearing wheels while the front and back shafts 14' and 18' respectively each have two pairs of tooth wheels for engaging the holes of the two endless treads 16'. The transmission system from the engine to the front shaft 14' comprises elements partly enclosed in box 34 at the center of the vehicle and thus between the two endless treads 16'. The suspension system is otherwise identical with the one described hereinabove.

The front of the vehicle in accordance with the present invention is carried by a pair of steering skis. Skis 35 are each provided with a holding plate 36 pivoted to a rod 37 in such a manner that the plate 36 has freedom to pivot in a vertical but not in a horizontal plane. The rod 37 slides within a sleeve 38 which is secured to the bottom 7 of the hood 5 and projects inside said hood. An arm 39 is removably secured by bolt 40 to the upper end of rod 37. The arms 39 of the two skis are interconnected by link rod 41 which is transversely displaced by means of steering handles 42 and lever 43. The steering handles 42 have an axle 44 journaled in brackets 45 secured inside the hood 5. A coil spring 46 surrounds the sleeve 38 and the rod 37 and abuts against the bottom wall 7 of hood 5 and against the plate 36 to form a resilient suspension for each ski, whereby the latter may absorb shocks caused by bumps and holes. The skis are steered by the guiding handles 42 which cause rotation of the rods 37 about their longitudinal axis while allowing said rods to longitudinally slide within sleeve 38 because the pivotal joints between lever 43, link rod 41 and arms 39 allow this longitudinal movement.

In order to remove the skis, the bolts 40 are unscrewed and the rods 37 may be removed with their associated ski together with spring 46; thus the vehicle requires a minimum of shipping or storing space.

The skis and also the endless track assembly can be easily replaced by wheels for using the vehicle on roads.

While a preferred embodiment in accordance with the present invention has been illustrated and described, it is understood that various modifications may be resorted to without departing from the spirit and scope of the appended claims.

What I claim is:

1. In a motor vehicle having an inverted U-shaped frame and provided with an endless track, means for mounting said track under said frame comprising a series of pairs of transverse shafts, spaced bearing wheels secured to and surrounding each of said shafts and in contact with the inside face of the lower ground engaging run and of the upper return run of said endless track, a pair of vertically disposed elongated lever plates facing each end of each pair of shafts, the lever plates of each pair being oppositely directed, having overlapping inner ends and rotatably supporting said shafts at their outer ends, a transverse rod secured to the sides of said frame and on which the inner ends of said pair of lever plates are pivotally mounted whereby the assembly of said pair of shafts and of said lever plates can swing about said transverse rod, a coil spring the convolutions of which surround said rod and having its ends secured to the respective lever plates of the pair of plates and urging said lever plates to pivot with respect to each other about said rod as a pivot in a direction towards said ground engaging run of said track, abutment means for limiting the spring urged relative pivotal movement of said pair of lever plates, said lever plates and transverse rods being wholly confined in the space defined by the planes containing said upper and lower runs of said track.

2. In a motor vehicle as claimed in claim 1, further including a front transverse shaft rotatably mounted in the sides of said frame, toothed wheels secured to said front shaft for meshing engagement with said endless track, a rear transverse shaft rotatably supported by the sides of said frame, second toothed wheels secured to said rear shaft and longitudinally aligned with the respective toothed wheels of the front shaft, said endless track comprising a rubber band provided with two series of longitudinally disposed holes for receiving the teeth of said toothed wheels of the front and back shafts, said bearing wheels being mounted in a staggered manner so as to alternate on each side of the lines joining the aligned front and back toothed wheels and to bear on the track on each side of the series of holes made in said track.

3. In a motor vehicle as claimed in claim 2 further including brackets longitudinally adjustably secured to the rear end portion of the sides of said frame, lever arms having their rear ends pivotally connected to said brackets, said rear shaft being rotatably mounted on the forward free ends of said lever arms, so constructed and arranged that tension exerted by said return run on the toothed wheels of the rear shaft tends to pivot said lever arms toward the ground, said brackets serving to adjust the initial tension of said endless track.

4. In a motor vehicle as claimed in claim 2, wherein said rear transverse shaft and the shaft associated with said lever plates are tubular and have end closures spaced from the ends of said tubular shafts to form an end cavity, a bearing fitted within said cavity and receiving a stud secured to each lever plate.

5. In a motor vehicle as claimed in claim 2, wherein said means for limiting the spring urged relative pivotal movement of said pair of lever plates comprises an abutment block secured to the inner end of one of said lever plates and a finger carried by the inner end of the other of said lever plates and adapted to abut said abutment block to limit said spring urged relative rotation in the direction toward said ground engaging run of said track.

6. In a motor vehicle as claimed in claim 2 wherein the inner ends of said lever plates have sleeves in telescopic engagement, said rod extending through the inner one of said sleeves, and the convolutions of said spring surrounding the outer one of said sleeves.

7. In a motor vehicle as claimed in claim 1, wherein said inverted U-shaped frame has laterally outwardly projecting horizontal flanges along the lower edge of each side of said frame and a hood carried by the front end of said frame and having lateral walls outwardly and laterally spaced from the sides of said U-shaped frame and secured to said flanges.

References Cited in the file of this patent

UNITED STATES PATENTS

| | | |
|---|---|---|
| 1,386,926 | Hagelloch | Aug. 9, 1921 |
| 2,052,900 | Searles et al. | Sept. 1, 1936 |
| 2,149,297 | Knox | Mar. 7, 1939 |
| 2,339,886 | Shannon | Jan. 25, 1944 |
| 2,427,006 | Knox | Sept. 9, 1947 |
| 2,708,978 | Robitaille | May 24, 1955 |
| 2,925,873 | Laporte | Feb. 23, 1960 |